Patented Nov. 17, 1942

2,302,467

UNITED STATES PATENT OFFICE 2,302,467

PROCESS OF OXIDIZING A MIXTURE OF A CYMENE AND A MENTHANE AND PRODUCTS THEREFROM

Robert C. Palmer, Carlisle H. Bibb, and William T. McDuffee, Jr., Pensacola, Fla., assignors to Newport Industries, Inc., Pensacola, Fla., a corporation of Delaware No Drawing. Application March 26, 1941, Serial No. 385,296

8 Claims. (Cl. 260—587)

This invention relates to a process of oxidizing a mixture of a cymene and a menthane and to the products produced thereby. More particularly, the invention relates to the catalytic oxidation of a mixture of p-cymene and p-menthane in liquid phase by means of molecular oxygen in the presence of an oxidizing catalyst. The products of the oxidation include alcohols, aldehydes, ketones, oxides and acids. After the removal of the acids and any unreacted hydrocarbons, a mixture comprising largely tertiary alcohols and ketones is obtained, which is useful as such because of its wetting, solvent and disinfecting properties and which may, accordingly, be used as a substitute for pine oil.

The present invention is a continuation-in-part of our copending application entitled "Process of oxidizing menthanes and products produced thereby," Serial No. 303,027, filed November 6, 1939. In that application the process of oxidizing a menthane and the recovery of acids from the oxidation reaction mass are described and claimed. The present application relates to a similar process but is directed more specifically to the recovery of the non-acid mixture of tertiary alcohols and ketones and to the products obtained.

It is therefore an important object of this invention to provide an efficient process for the catalytic oxidation of a mixture of a cymene and a menthane in liquid phase and for the recovery from the oxidation reaction mass of a non-acid mixture of tertiary alcohols and ketones, the mixture so obtained having valuable wetting, solvent and disinfecting properties and being useful as a mixture for purposes previously served by pine oil.

It is a further important object of this invention to provide a novel composition of matter comprising a mixture of tertiary alcohols and ketones obtainable by the catalytic oxidation of a mixture of a cymene, such as p-cymene, and a menthane, such as p-menthane.

Other and further important objects of this invention will become apparent from the following description and appended claims.

The starting material for our process is a mixture of a cymene and a menthane, such as a mixture of ortho-, para- or meta-cymene and ortho-, para- or meta-menthane, but more particularly a mixture of p-cymene and p-menthane. The latter mixture is suitably obtained by the hydrogenation-dehydrogenation of mono-cyclic terpenes, that is by the disproportionation of such terpenes, producing p-menthane and p-cymene.

Oxidation catalysts that have been found most satisfactory belong to the group of oxides and hydroxides of the heavy metals, and their organic salts. Such oxygen containing compounds of the heavy metals may be used either by themselves or in admixture with each other. Mixtures of manganese and lead acetates, benzoates, or cumates are examples of mixed catalysts that have been found highly effective. In fact, manganese and lead compounds, in admixture, are much to be preferred because they permit the carrying out of the oxidation process at lower temperatures than has been found possible when using a single heavy metal catalyst. However, the hydrates, oxides or organic salts of any of the various so-called heavy metals, such as manganese, lead, copper, cobalt, iron, nickel, molybdenum, vanadium, silver, chromium and mercury, can be added to the charge to produce catalytic activity. Some metals are more effective than others.

In the preparation of a specific catalytic mixture, such as that of manganese and lead acetate, such a mixture can be conveniently made by fusing together 1 part of lead acetate containing 3 moles of water with 2 parts of manganese acetate containing 4 moles of water. The fusion is carried out, for instance, at a temperature of about 130° C. until all of the water has been driven off and an anhydrous, solid mass is obtained. This solid mass is then pulverized and the powdered mixture used as a catalyst. The particular ratio of manganese to lead is not important, since either of these two metals is itself catalytically active, but preferably an effective proportion of each metal is present in the admixture.

The following example will serve to illustrate a preferred embodiment of our invention, starting with a mixture of p-menthane and cymene, such as can be obtained by the disproportionation of dipentene and or other mono-cyclic terpene hydrocarbons. Such a reaction product comprises substantially 33% of p-menthane and 66% of cymene:

160 gallons of a mixture of p-menthane and cymene are put in a vessel having a device for passing air or oxygen into the charge. The spent air or other gas then goes through a reflux cooler, from which any oil entrained in the gases is returned to the oxidizing vessel and the fixed gases are vented to the atmosphere. The vessel is equipped with heating, cooling and agitating means. About 3 lbs. of a powdered mixture of lead and manganese acetate, prepared as above described, are added to the charge of p-menthane and cymene and the oil and catalyst are agitated and heated to about 100° C., while air is being blown through the charge in a fine state of subdivision at the rate of about 10 cu. ft. per minute for a period of about 15 hours. There is thus produced about 150 gallons of oxidized oil. This oil is then fractionally distilled under vacuum to yield the following fraction:

| | |
|---|---|
| Unreacted p-menthane and cymene in admixture | 76 |
| Oil consisting of a mixture of alcohols, aldehydes, oxides and ketones | 32 |
| Residue, comprising a mixture of acids including hexa-hydro cumic and hexa-hydro toluic acid and cumic acid | 35 |

Alternatively, the oxidation reaction mass may be washed with an aqueous alkali solution, such as a weak caustic solution of, say, 6% concentration, to remove the acids. After separation of the aqueous alkaline solution containing the acids from the rest of the reaction mass, the remaining reaction mass may be subjected to distillation under high vacuum and a cut obtained consisting of a mixture of alcohols, aldehydes, oxides and ketones.

In general, the mixture of alcohols, aldehydes, ketones and oxides, obtained in either of the above described manners, will consist largely of tertiary alcohols and ketones, with only minor proportions of aldehydes and oxides. The oxidation products of cymene are dimethyl tolyl carbinol and p-methyl acetophenone, while the oxidation products of menthane are the corresponding cyclohexane derivatives.

The physical properties of the mixture of tertiary alcohols and ketones are substantially as follows:

| | Between |
|---|---|
| Specific gravity of 15.5° C. | 0.94 and 0.99 |
| Boiling point at 760 mm. | 175° and 240° C. |
| Index of refraction $D_{20°}$ | 1.49 and 1.54 |

The mixture of tertiary alcohols and ketones, with minor proportions of aldehydes and oxides, derived from the oxidation of a mixture of p-menthane and cymene, has been found to be of value as a substitute for pine oil, which in many ways it resembles. For example, this mixture forms clear concentrated solutions with soaps and water that give relatively stable emulsions on dilution, which have wetting out properties equal to similar pine oil compounds. Also, the germicidal power of the mixture is of the same order as that of steam distilled pine oil. The mixture, further, is a good solvent for resins and oils, thus adapting it for use in surface coating compositions.

The temperature of 100°, given in the foregoing example, is not critical, since higher temperatures may be used, such as up to 170° C., or lower temperatures, as low as 15° C., may be used. With the lower temperatures, the reaction becomes slower.

Other changes in the procedure may be made by those skilled in the art. More or less air may be used, but if less air is employed, the oxidation does not go so far and therefore a lower yield of the oxidation products is obtained.

In the course of the oxidation reaction, starting with a mixture of p-menthane and cymene, there is a tendency toward the formation of peroxide-like compounds, which thermally decompose very easily to liberate considerable heat and to produce gases that are very difficult to condense. In order to prevent the decomposition of such peroxide-like compounds with explosive violence when heated under conditions suitable for distillation, we find it advisable to advance the temperature in the still to around 125 to 145° C. and to maintain that temperature by circulation of cold water, if necessary, through the jacket of the still, until decomposition of the thermally decomposable oxygen-containing compounds has taken place. Decomposition of the peroxide-like compounds takes place rapidly at the temperature indicated, but by providing ample vacuum capacity and by circulating cooling water through the jacket of the still, the rate of evolution of non-condensible gases can be satisfactorily controlled so as to prevent substantial loss of vacuum and consequent rise in the boiling temperature of the charge in the still. Distillation is continued until the separation of the desired products of oxidation has been effected.

When other than the para compounds of menthane and cymene are oxidized by this method, the corresponding oxygenated products are produced. In the case of p-menthane, the oxygen attacks the tertiary carbon atom of the isopropyl side chain, forming dihydro terpeneol, which may be further oxidized to the ketone and formaldehyde. At the same time, oxides are also produced, the latter being capable of isolation as an intermediate fraction between the recovered p-menthane and the alcohols and ketones, when the crude oxidized product is fractionally distilled. P-cymene, as stated above, is converted by the oxidation process into dimethyl tolyl carbinol and p-methyl acetophenone. Accordingly, the final mixture of tertiary alcohols and ketones, isolated by our method, contains the oxidation products of both the menthane and cymene present in the starting mixture.

The extent to which the oxidation is carried in any given batch may be varied over a considerable range, by controlling the rate of introduction of oxygen or the time of such introduction. If a smaller proportion of the cymene and menthane is converted into its oxidation product, then more cymene and menthane may be recovered for reoxidation in a subsequent run. Alternatively, the oxidation may be continued until practically no cymene or menthane remains unconsumed.

The proportion of catalyst used may be varied, depending upon whether or not it is desired to speed up or slow down the rate of oxidation. From a practical standpoint, however, the proportion of catalyst will, in general, lie within the range of from 0.1 to 5% of the weight of the charge.

It will, of course, be understood that various details of the process may be varied through a wide range without departing from the principles of this invention and it is, therefore, not the purpose to limit the patent granted hereon otherwise than necessitated by the scope of the appended claims.

We claim as our invention:

1. The process of oxidizing a mixture of a cymene and a menthane, which comprises reacting said mixture in liquid phase with molecular oxygen in the presence of a catalytically active heavy metal compound selected from the group consisting of oxides, hydroxides and carboxylic acid salts of the heavy metals at temperatures up to 170° C. until a substantial conversion of said cymene and menthane into alcohols, aldehydes, ketones, oxides and acids has been effected, removing the acids from the reaction mass and recovering a mixture of the alcohols, aldehydes, ketones and oxides.

2. The process of oxidizing a mixture of a cymene and a menthane, which comprises reacting said mixture in liquid phase at temperatures up to 170° C. with molecular oxygen in the presence of a catalytically active heavy metal compound selected from the group consisting of oxides, hydroxides and carboxylic acid salts of the heavy metals until a substantial conversion of said cymene and menthane into alcohols, aldehydes, ketones, oxides and acids has been effected, and fractionally distilling the resulting reaction mass to recover a mixture of said alcohols, aldehydes, ketones and oxides.

3. The process of oxidizing a mixture of p-cymene and p-menthane, which comprises reacting said mixture in liquid phase at temperatures up to 170° C. with molecular oxygen in the presence of a catalytically active heavy metal organic salt until a substantial conversion of said cymene and menthane into alcohols, aldehydes, ketones, oxides and acids has been effected, washing the resulting reaction mass with an aqueous alkali solution to remove said acids, and fractionally distilling the remaining reaction mass to recover a mixture of said alcohols, aldehydes, ketones and oxides.

4. The process of oxidizing a mixture of p-cymene and p-menthane, which comprises reacting said mixture in liquid phase at temperatures up to 170° C. with molecular oxygen in the presence of a catalytically active mixture consisting essentially of lead and manganese compounds selected from the group consisting of oxides, hydroxides and carboxylic acid salts of lead and manganese until a substantial conversion of said cymene and menthane into alcohols, aldehydes, ketones, oxides and acids has been effected, removing said acids and fractionally distilling the remaining reaction mass to recover a mixture of said alcohols, aldehydes, ketones and oxides.

5. The process of oxidizing a mixture of p-cymene and p-menthane, which comprises reacting said mixture in liquid phase with molecular oxygen at a temperature between 15° and 170° C. in the presence of an oxidation catalyst consisting essentially of both lead and manganese compounds selected from the group consisting of oxides, hydroxides and carboxylic acid salts of lead and manganese until a substantial conversion of said cymene and menthane into alcohols, aldehydes, ketones, oxides and acids has been effected, and isolating a mixture of said alcohols, aldehydes, ketones and oxides, substantially free from acids.

6. In the process of preparing a mixture of a non-acid oxidation product of cymene and menthane, the steps of reacting a mixture of a cymene and a menthane in liquid phase with molecular oxygen at temperatures not exceeding 170° C. in the presence of a catalytically active heavy metal compound selected from the group consisting of oxides, hydroxides and carboxylic acid salts of the heavy metals until a substantial conversion of said cymene and menthane into alcohols, aldehydes, ketones, oxides and acids has been effected, washing the resulting oxidation reaction mass with an aqueous alkaline solution to extract the acids therefrom, and recovering a non-acid mixture of alcohols, aldehydes, ketones and oxides.

7. In the process of preparing a non-acid mixture of the oxidation products of a mixture of p-cymene and p-menthane, the steps of reacting said mixture of p-cymene and p-menthane in liquid phase with molecular oxygen at temperatures not exceeding 170° C. in the presence of a catalytically active mixture of lead and manganese compounds selected from the group consisting of oxides, hydroxides and carboxylic acid salts of lead and manganese until a substantial conversion of said p-cymene and p-menthane into alcohols, aldehydes, ketones, oxides and acids has been effected, separating the acids from the remaining reaction mass, and recovering therefrom a non-acid mixture of the alcohols, aldehydes, ketones and oxides.

8. As a new composition of matter, a mixture of alcohols, aldehydes, ketones and oxides substantially free from acids, said mixture being obtained by catalytically oxidizing by means of a catalytically active heavy metal compound selected from the group consisting of oxides, hydroxides and carboxylic acid salts of the heavy metals a mixture of p-cymene and p-menthane in liquid phase at temperatures not exceeding 170° C., separating the acids from the resulting reaction mass and recovering the alcohols, aldehydes, ketones and oxides, said mixture having a specific gravity at 15.5/4° C. between 0.94 and 0.99 and a boiling point range at 760 mm. between 175° and 240° C. and an index of refraction, $D_{20}$° between 1.49 to 1.54.

ROBERT C. PALMER.
CARLISLE H. BIBB.
WILLIAM T. McDUFFEE, Jr.